United States Patent
Iwaki

(10) Patent No.: US 11,949,847 B2
(45) Date of Patent: Apr. 2, 2024

(54) RECORDING DEVICE, REPRODUCTION DEVICE, SYSTEM, RECORDING METHOD, REPRODUCTION METHOD, RECORDING PROGRAM, AND REPRODUCTION PROGRAM

(71) Applicant: DWANGO Co., Ltd., Tokyo (JP)

(72) Inventor: Shinnosuke Iwaki, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 17/686,792

(22) Filed: Mar. 4, 2022

(65) Prior Publication Data
US 2022/0385878 A1 Dec. 1, 2022

Related U.S. Application Data

(63) Continuation of application No. PCT/JP2020/036810, filed on Sep. 29, 2020.

(30) Foreign Application Priority Data

Sep. 30, 2019 (JP) ................. 2019-181022

(51) Int. Cl.
*H04N 13/189* (2018.01)
*H04N 5/907* (2006.01)

(52) U.S. Cl.
CPC ........... *H04N 13/189* (2018.05); *H04N 5/907* (2013.01)

(58) Field of Classification Search
CPC ...... H04N 13/189; H04N 5/907; H04N 19/00; H04N 5/93; H04N 5/92; G11B 27/327;
(Continued)

(56) References Cited

U.S. PATENT DOCUMENTS 10,573,073 B2 * 2/2020 Hirota ................ G06T 7/20
11,726,320 B2 * 8/2023 Ishihara ............... G09G 5/36
345/156
(Continued)

FOREIGN PATENT DOCUMENTS

JP 2000123191 A 4/2000
JP 2002063034 A 2/2002
(Continued)

OTHER PUBLICATIONS

"Translation of International Search Report for PCT/JP2020/036810, dated Nov. 2, 2020".
(Continued)

*Primary Examiner* — Thai Q Tran
(74) *Attorney, Agent, or Firm* — Dorsey & Whitney LLP

(57) ABSTRACT

In a recording device configured to record a motion of an object in a virtual space, a data structure of data related to the motion of the object recorded by the recording device is used for a process of reproducing the motion of the object in the reproduction device. The recording device includes a controller and a storage. The controller causes the storage to store, in association with the object, the data related to the motion of the object and data related to available functions for a process of moving the object. The data related to the available functions for the process of moving the object is stored in the storage so that the reproduction device is able to specify a function class that is reproducible by the reproduction device.

18 Claims, 14 Drawing Sheets

(58) Field of Classification Search
CPC . G11B 20/10; G06F 3/01; G06F 3/038; G06F 3/0481; G06F 3/0484; G06T 13/20
USPC .......................................................... 348/51
See application file for complete search history.

(56) References Cited

U.S. PATENT DOCUMENTS

| | | | |
|---|---|---|---|
| 2007/0097129 A1* | 5/2007 | Minakuchi | G06T 15/00 345/473 |
| 2018/0314322 A1* | 11/2018 | Tseng | G06T 19/006 |
| 2020/0241513 A1* | 7/2020 | Yoshikawa | G05B 19/41885 |
| 2023/0226460 A1* | 7/2023 | Gotoh | G06T 19/006 472/75 |
| 2023/0360184 A1* | 11/2023 | Wu | G06T 7/70 |

FOREIGN PATENT DOCUMENTS

| | | |
|---|---|---|
| JP | 2002260004 A | 9/2002 |
| JP | 2005267655 A | 9/2005 |
| JP | 6446154 B1 | 12/2018 |
| WO | 2019069436 | 4/2019 |
| WO | 2021065868 A1 | 4/2021 |

OTHER PUBLICATIONS

[English translation] Notice of Second Office Action for Chinese Patent Application No. 202080060681.4 dated Nov. 28, 2023, pp. all.

* cited by examiner

FIG.3

DATA SORTING RULE — 1011

| OBJECT MOTION | OBJECT FUNCTION | | | |
|---|---|---|---|---|
| | LEVEL 1 | LEVEL 2 | LEVEL 3 | ... |

OBJECT MOTION DB (MOTION OF PEN) — 1012

| TIME | 00:00 | 00:28 | 01:04 | ... |
|---|---|---|---|---|
| COORDINATES | X0, Y0, Z0 | X1, Y1, Z1 | X2, Y2, Z2 | ... |

OBJECT FUNCTION DB (DRAW RED LINE) — 1013

| LEVEL 1 | LEVEL 2 | LEVEL 3 | ... |
|---|---|---|---|
| MOVE THE PEN | DRAW LINE | DRAW LINE IN USER-DESIGNATED COLOR | ... |

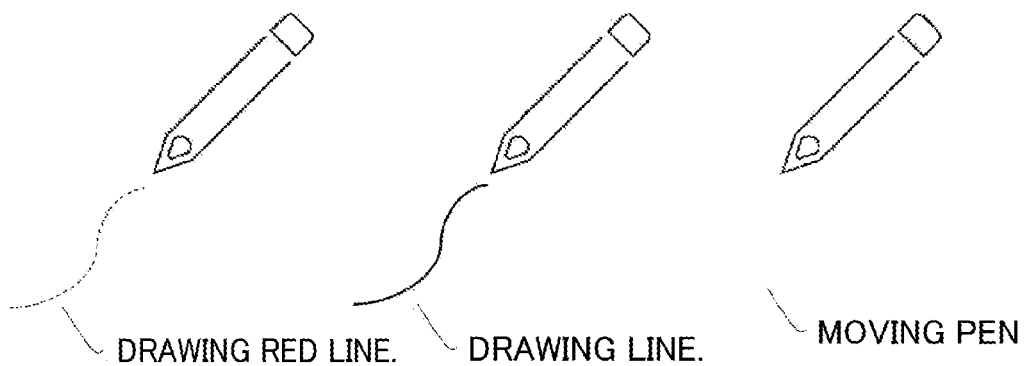
FIG.5A  FIG.5B  FIG.5C
DRAWING RED LINE.  DRAWING LINE.  MOVING PEN
FIG.6
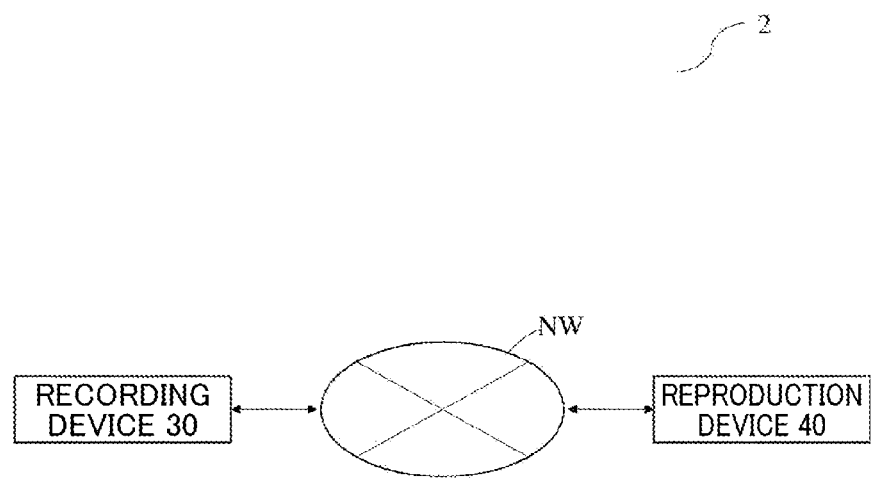

| DATA SORTING RULE | | | | |
|---|---|---|---|---|
| OBJECT MOTION | COMMENT DISPLAYING FUNCTION | | | |
| | LEVEL 1 | LEVEL 2 | LEVEL 3 | ... |

3012

| OBJECT MOTION DB (MOTION OF PEN) | | | | |
|---|---|---|---|---|
| TIME | 00:00 | 00:28 | 01:04 | ... |
| COORDINATES | X0, Y0, Z0 | X1, Y1, Z1 | X2, Y2, Z2 | ... |

3013

| COMMENT DISPLAYING FUNCTION DB | | | |
|---|---|---|---|
| LEVEL 1 | LEVEL 2 | ... | ... |
| DISPLAYING COMMENT IN PREDETERMINED COLOR | DISPLAYING COMMENT IN USER-DESIGNATED COLOR | ... | ... |

DISPLAYING COMMENT IN RED

DISPLAYING COMMENT IN PREDETERMINED COLOR

FIG.14

| DATA SORTING RULE | | | | |
|---|---|---|---|---|
| OBJECT MOTION | GIFTING FUNCTION | | | |
| | LEVEL 1 | LEVEL 2 | LEVEL 3 | ... |

5011

| OBJECT MOTION DB (MOTION OF PEN) | | | | |
|---|---|---|---|---|
| TIME | 00:00 | 00:28 | 01:04 | ... |
| COORDINATES | X0, Y0, Z0 | X1, Y1, Z1 | X2, Y2, Z2 | ... |

5012

| GIFTING FUNCTION DB | | | |
|---|---|---|---|
| LEVEL 1 | LEVEL 2 | ... | ... |
| DISPLAYING GIFT OBJECT IN PREDETERMINED FORM. | DISPLAYING GIFT OBJECT OF USER-DESIGNATED TYPE. | ... | ... |

5013

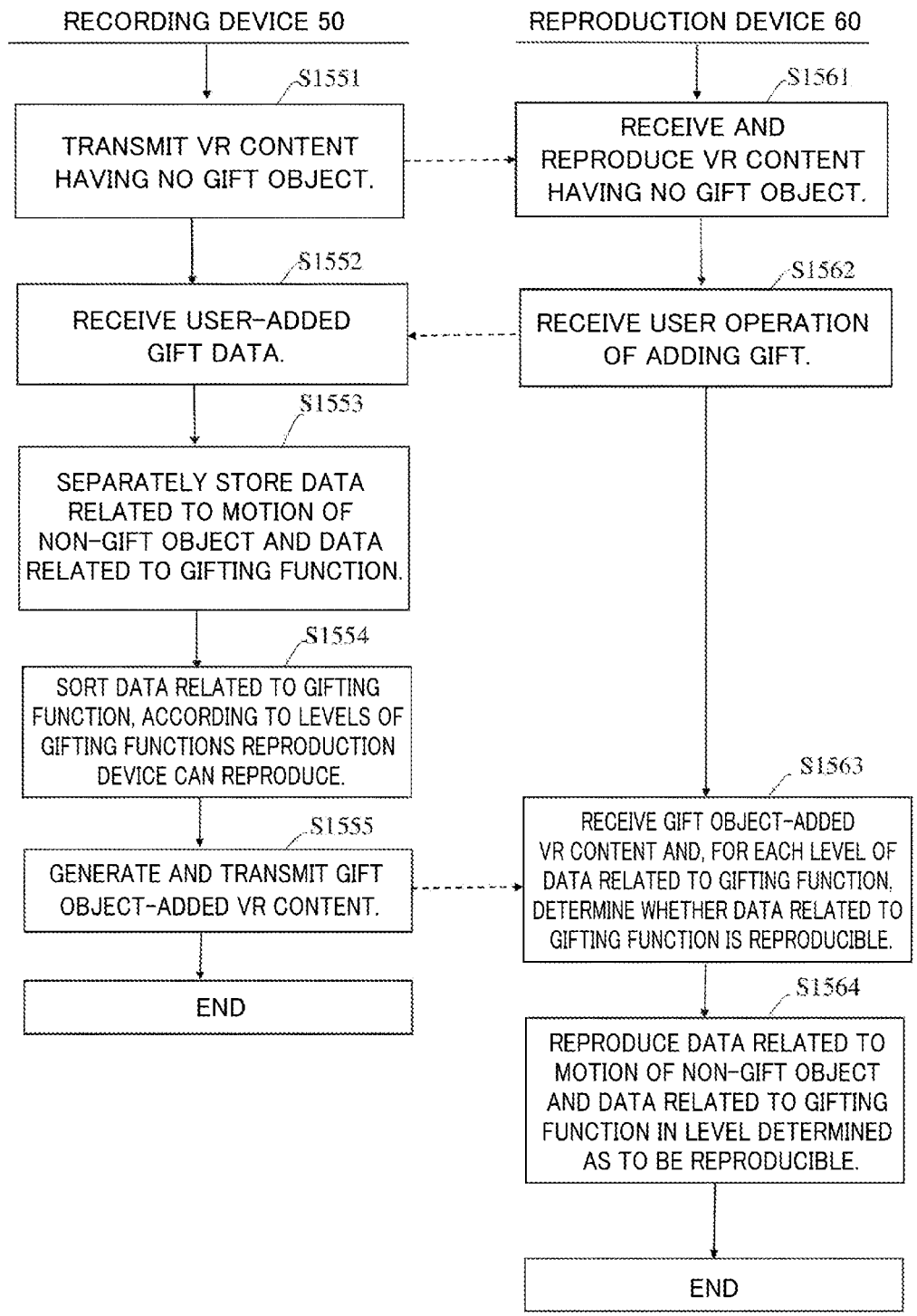

FIG.16A
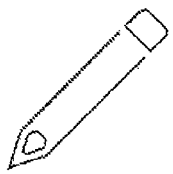
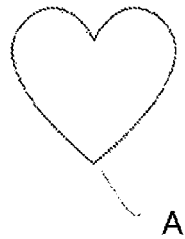
ADD HEART-SHAPED GIFT OBJECT.
FIG.16B
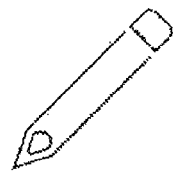
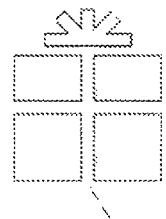
ADD PREDETERMINED GIFT OBJECT.

RECORDING DEVICE, REPRODUCTION DEVICE, SYSTEM, RECORDING METHOD, REPRODUCTION METHOD, RECORDING PROGRAM, AND REPRODUCTION PROGRAM

CROSS-REFERENCE TO RELATED APPLICATION(S)

This application is a continuation of PCT Application No. PCT/JP2020/036810 filed Sep. 29, 2020, which claims priority to Japanese Application No. 2019-181022 filed Sep. 30, 2019, which are incorporated herein by reference, in their entirety, for any purpose.

TECHNICAL FIELD

The present disclosure relates to a recording device, a reproduction device, a recording/reproduction system, a recording method, a reproduction method, a recording program, and a reproduction program for VR content.

BACKGROUND

There has been traditionally known a technology that records, as VR content, an object and motions of the object by using a VR (Virtual Reality) technology, and that reproduces such VR content by using a reproduction device. For example, WO 2019/069436 discloses obtaining information of three-dimensional coordinates of each point of time indicating an operational state of plant equipment, and displaying a video image simulating a motion of a three-dimensional shape indicating the operational state of the plant equipment, based on a reproduction instruction.

However, to date, various methods coexist as methods of recording and reproduction processing of VR content. For example, in a case where VR content of a certain motion is recorded by a recording device and read by a reproduction device, and the reproduction device does not have a reproduction program that enables reproduction of the motion, there is a possibility that the VR content cannot be reproduced.

Further, as the functions of the recording device that records VR content are upgraded in updated versions or the like, thus increasing the functions of the recording device that can be set to the objects, the same functions to reproduce the VR content will be required in a reproduction side too. Here, in a case where the program that causes a computer to operate as the recording device and a program that causes a computer as the reproduction device are provided by a single provider, the program on the reproduction side is expected to be updated with an update of the program on the recording side so that the functions that can be set in the recording device can also be implemented in the reproduction device.

However, due to different user preferences, there may be various providers who provide programs that operate a computer as the reproduction device, in which case there may be a possibility that a program for the reproduction device failing to support the updated version of the program for the recording device. As a result, a user of the reproduction device may not be able to reproduce the VR content. In view of this, there is a demand for a technology that enables reproduction of the VR content to an extent that can be reproduced with the functions of the reproduction device, even if reproduction of the entire VR content may not be possible.

In view of the above circumstances, it is an object of the present disclosure to provide a technology that enables a user to view VR content even if a reproduction device fails to fully support the functions of a recording device.

SUMMARY

According to one embodiment, a recording device configured to record a motion of an object in a virtual space is provided. A data structure of data related to the motion of the object recorded by the recording device is used for a process of reproducing the motion of the object in the reproduction device. The recording device includes a controller and storage. The controller causes the storage to store, in association with the object, the data related to the motion of the object and data related to available functions for a process of moving the object. The data related to the available functions for the process of moving the object is stored in the storage so that the reproduction device is able to specify a function class that is reproducible by the reproduction device.

According to one embodiment, a reproduction device configured to reproduce data recorded by the recording device is provided. The reproduction device is configured to specify a function that is reproducible in the reproduction device, out of the data related to the available functions for the process of moving the object, and reproduce the motion of the object by using the data related to the motion of the object and the data related to the function specified.

According to one embodiment, there is provided a system including a recording device configured to record a motion of an object in a virtual space and a reproduction device configured to reproduce data recorded by the recording device. A data structure of data related to the motion of the object recorded by the recording device is used for a process of reproducing the motion of the object in the reproduction device. The recording device includes a controller and storage. The controller causes the storage to store, in association with the object, the data related to the motion of the object and data related to available functions for a process of moving the object. The data related to the available functions for the process of moving the object is stored in the storage so that the reproduction device is able to specify a function class that is reproducible by the reproduction device. The reproduction device is configured to specify a function that is reproducible in the reproduction device, out of the data related to the available functions for the process of moving the object, and reproduce the motion of the object by using the data related to the motion of the object and the data related to the function specified.

According to one embodiment, a recording method of recording a motion of an object in a virtual space is provided. A data structure of data related to the motion of the object recorded by the recording method is used for a process of reproducing the motion of the object in the reproduction device. The recording method includes storing, in association with the object, the data related to the motion of the object and data related to available functions for a process of moving the object. The data related to the available functions for the process of moving the object being stored so that the reproduction device is able to specify a function class that is reproducible by the reproduction device.

According to one embodiment, a reproduction method of reproducing data recorded by the recording method is provided. The reproduction method includes: specifying a function that is reproducible in the reproduction device, out of the data related to the available functions for the process of moving the object; and reproduce the motion of the object by using the data related to the motion of the object and the data related to the function specified.

According to one embodiment, a recording program executable in a computer that records a motion of an object in a virtual space is provided. A data structure of data related to the motion of the object recorded by the recording program is used for a process of reproducing the motion of the object in the reproduction device. The computer includes a processor and a memory, and the recording program causes the processor to store, in association with the object, data related to the motion of the object and the data related to available functions for a process of moving the object. The data related to the available functions for the process of moving the object being stored so that the reproduction device is able to specify a function class that is reproducible by the reproduction device.

According to one embodiment, a reproduction program executable in a computer that reproduces data recorded by the recording program is provided. The computer includes a processor and a memory, and the recording program causes the processor to specify a function that is reproducible in the reproduction device, out of the data related to the available functions for the process of moving the object; and reproduce the motion of the object by using the data related to the motion of the object and the data related to the function specified.

With the present disclosure, it is possible to provide a reproduction device capable of reproducing VR content to a reproducible extent based on functions reproducible in the reproduction device, while providing a recording device configured to record VR content.

BRIEF DESCRIPTION OF THE DRAWINGS

FIG. 3 is a diagram showing an exemplary data structure of data stored in the recording device according to the first embodiment of the present disclosure.

FIGS. 5A-C are diagrams showing an exemplary display screen of the reproduction device according to the first embodiment of the present disclosure.

FIG. 6 is a diagram showing an overall configuration of a content recording/reproduction system according to a second embodiment of the present disclosure.

FIG. 9 is a diagram showing an exemplary data structure of data stored in the recording device according to the second embodiment of the present disclosure.

FIG. 14 is a diagram showing an exemplary data structure of data stored in the recording device according to the third embodiment of the present disclosure.

FIG. 15 is a flowchart showing an exemplary process flow of a content recording/reproduction system according to the third embodiment of the present disclosure.

FIGS. 16A and B are diagrams showing an exemplary display screen of the reproduction device according to the third embodiment of the present disclosure.

DETAILED DESCRIPTION

Figure 1:
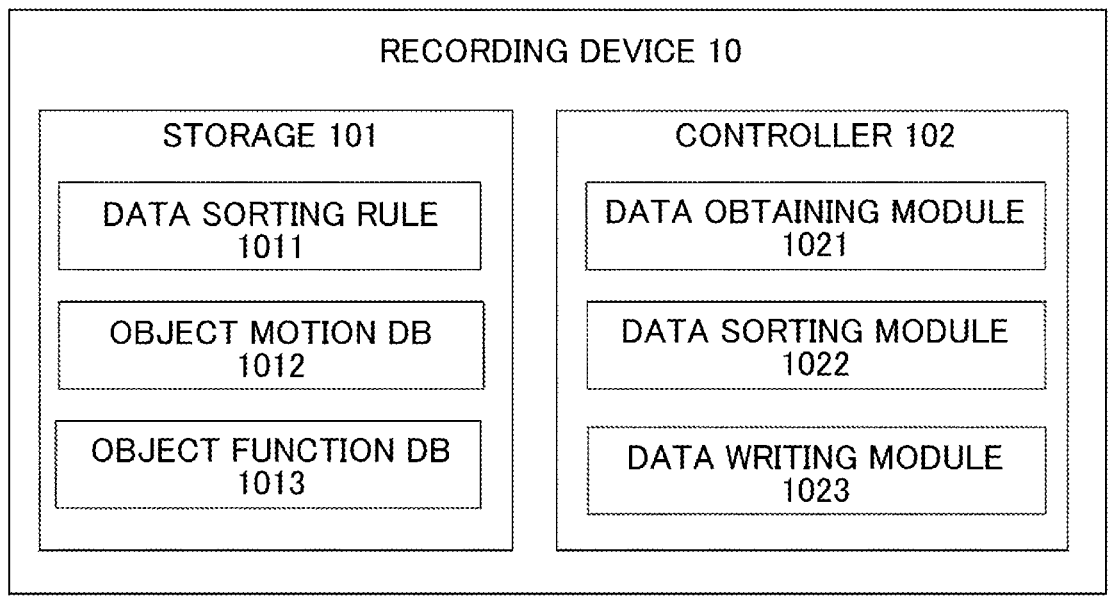
FIG. 1 is a diagram illustrating a functional configuration of a recording device according to a first embodiment of the present disclosure.

First, terms used herein will be described. The "VR content" means data containing three-dimensional computer graphics (3DCG) and audio, for a user to experience virtual reality (VR). Further, "3DCG space" is a virtual space expressed in the form of the 3DCG drawn on a display and the like. An "object" is a virtual object arranged in the 3DCG space and encompasses an avatar object.

In the following, embodiments of the present disclosure will be described with reference to the drawings. In the following description, the same components are denoted by the same reference characters. The names and functions for such components are also the same, and descriptions of these components are not repeated.

First Embodiment

The following describes a first embodiment of the present disclosure, which is a content recording/reproduction system that records VR content by a recording device and reproduces (performs time-shift reproduction of) the VR content by a reproduction device.

<1 Configuration of Content Recording/Reproduction System>

First, with reference to FIG. 1, the following describes a configuration of a content viewing system, a functional configuration of a recording device 10, and a functional configuration of a reproduction device 20, according to the present embodiment.

Figure 2:
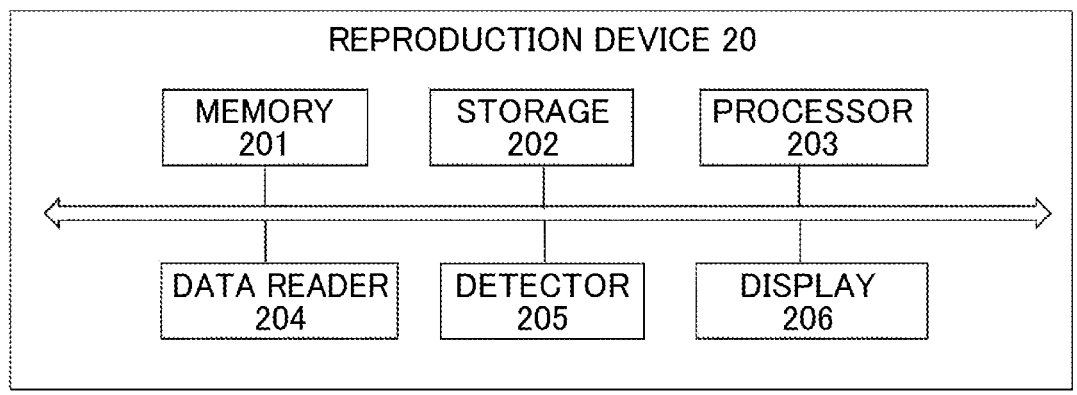
FIG. 2 is a diagram showing a functional configuration of the reproduction device according to the first embodiment of the present disclosure.

The content viewing system includes the recording device 10 shown in FIG. 1 and the reproduction device 20 shown in FIG. 2. The recording device 10 records a motion of an object in a virtual space and stores the same as VR contents. The reproduction device 20 reads the VR content recorded by the recording device 10 and reproduces the motion of the object.

The recording device 10 and the reproduction device 20 can communicate with each other via a network. The recording device 10 may upload the recorded VR content to a server device or the like. The reproduction device 20 receives the uploaded VR content from the server device or the like. In other words, the VR content recorded by the recording device 10 is provided to the reproduction device 20 by distribution in the form of a recording medium or distribution via a network such as the Internet. Various types of recording media are adoptable for storing the VR content, and examples of such recording media include: a recording medium that records information optically, electrically, or magnetically such as a Blu-ray (registered trademark) Disc read-only-memory (BD-ROM), a flexible disk, a magneto-optical disk; a semiconductor memory that records information electrically, such as a ROM and a Flash memory; or the like. Further, the communication line of the network may be wired or wireless.

<1.1 Configuration of Recording Device 10>

FIG. 1 is a diagram illustrating a functional configuration of the recording device 10. The recording device 10 is a device that records a motion of an object in the virtual space and stores the motion as VR content. As illustrated in FIG. 1, the recording device 10 includes a storage 101 and a controller 102.

For example, the virtual space may have a spherical configuration. In the virtual space, for example, an XYZ coordinate system having the center of the virtual space as an origin is defined, and the position of each object arranged in the virtual space is defined by a coordinate value in the XYZ coordinate system defined in the virtual space. The XYZ coordinate system may correspond to, for example, a global coordinate system in real space. Since the XYZ coordinate system is a type of coordinate system in the virtual space, the horizontal direction, orthogonal direction (upward-downward direction), and the front-rear direction are defined as an X-axis, a Y-axis, and a Z-axis, respectively. Therefore, the X-axis (horizontal direction) of the XYZ coordinate system may be parallel to the X-axis of the global coordinate system, the Y-axis (orthogonal direction) of the XYZ coordinate system may be parallel to the Y-axis of the global coordinate system, and the Z-axis (front-rear direction) of the XYZ coordinate system may be parallel to the Z-axis of the global coordinate system.

The storage 101 stores data and a program for recording a motion of an object as VR content, and more specifically, stores a data sorting rule 1011, an object motion database 1012, and an object function database 1013. The data sorting rule 1011 is a database that stores rules relating to classes of data that can be specified by the reproduction device at a time of reproducing data indicating the motion of the object. The object motion database 1012 and the object function database 1013 are each a database that stores data indicating the motion of the object. The details will be described later.

The controller 102 performs a process of storing, in the storage 101, the motion of the object in the virtual space as data. Specifically, the controller 102 functions as various modules by causing a processor of the recording device 10 to perform processes according to a program.

A data obtaining module 1021 performs a process of obtaining data related to the motion of the object in the virtual space. For example, the data obtaining module 1021 obtains an operation by a user of the recording device 10 on a controller to move the object. Such a controller encompasses a controller held by both hands of the user and hand controllers separately held by the left hand and the right hand of the user. For example, when the user of the recording device 10 stores and moves any of the hand controllers, a pen object may be moved in the virtual space based on a tracking result of a motion of the hand controller in real space. At this time, in conjunction with the motion of the pen object in the virtual space, a line object may be generated upon receiving an input operation on a button or the like on the hand controller. Alternatively, the data obtaining module 1021 may obtain data related to the motion of the object in the virtual space based on a result of capturing a motion of a part of or the whole body of the user. Further, in a case where the user of the recording device 10 wears a head mount device, an input operation may be performed to the object in the virtual space and the object may be moved based on the motion of the head mount device.

A data sorting module 1022 performs a sorting process for the data related to the motion of the object in the virtual space obtained by the data obtaining module 1021, based on the data sorting rule stored in the storage 101.

A data writing module 1023 performs a writing process of data having been subjected to the sorting process to the object motion database (DB) 1012 and the object function DB 1013.

Although illustration is omitted, the recording device 10 may have a communication unit in some embodiments. The communication unit transmits the VR content recorded by the recording device 10 to an external device via a network.

<1.2 Configuration of Reproduction Device 20>

The reproduction device 20 is an image display device that generates a virtual space to reproduce VR content, such as a stationary monitor, the head mount device worn by the user, or the like. The reproduction device 20, when implemented as a head mount device, can express a 360-degree field of view by interlocking content with the direction of the user's face. The head mount device may be a so-called head mount display having a display, or a head mount machine that allows mounting of a terminal having a display such as a smartphone.

FIG. 2 is a diagram illustrating a functional configuration of the reproduction device 20. As illustrated in FIG. 2, the reproduction device 20 is a device for reproducing VR content, and includes a memory 201, storage 202, a processor 203, a data reader 204, a detector 205, and a display 206. For example, the reproduction device 20 is a stationary monitor, a head mount device worn on the head of a user, or the like.

The memory 201 is a volatile memory such as a dynamic random access memory (DRAM) for temporarily storing a program, data processed by the program, and the like.

The storage 202 is a storage device, such as flash memory, hard disk (HDD), which is configured to store data.

The processor 203 is a piece of hardware for executing a set of commands coded in a program, and includes an arithmetic device, a register, a peripheral circuit, and the like.

The data reader 204 reads data related to the motion of the object recorded by the recording device 10 to an extent that the reproduction device 20 can reproduce, through predetermined steps. For example, the reproduction device 20 successively reads data related to the motion of the object and data related to the object functions.

The detector 205 includes a gravity sensor, a gyro sensor, an acceleration sensor, and the like, and detects rotation, inclination, and vibration of the reproduction device 20. Note that the detector 205 may be of another type as long as it is capable of detecting displacement of the reproduction device 20. For example, in a case where the reproduction device 20 is configured as a head mount device, the detector 205 detects a motion of the user's head wearing the head mount device. Further, for example, in a case where the reproduction device 20 is implemented in a mobile device such as a smartphone, a tablet terminal, and the like, the detector 205 detects inclination of the reproduction device 20. As described, the detector 205 detects an operation by the user with respect to the reproduction device 20.

The display 206 displays content distributed from a content distribution server 10. In one example, in a case where the reproduction device 20 is configured as a head mount device, the display 206 is arranged in a main body of the reproduction device 20 and positioned forward to both eyes of the user, and an image for the right eye and an image for the left eye are displayed on the display 206. When the eyes of the user visually recognize the respective images, the user can recognize the images as a three-dimensional image based on the parallax of the eyes and can immerse him/herself in the virtual space.

For example, the display 206 is implemented as a non-transmissive or transmissive display device, and an organic electroluminescence (organic EL), an liquid crystal display (LCD), or the like may be used. Further, a retinal projection type device may be adopted.

Although illustration is omitted, the reproduction device 20 may have a communication unit in some embodiments. With the communication unit, VR content recorded by the recording device 10 is transmitted from an external device to the reproduction device 20 via a network.

<2 Data Structure>

The following describes a data structure of data stored in the recording device 10 related to the first embodiment of the present disclosure, with reference to FIG. 3.

FIG. 3 is a diagram showing an exemplary data structure of data constituting the VR content, which is stored in the recording device 10 of the first embodiment. The storage 101 of storage device 10 stores the data sorting rule 1011, the object motion database 1012, and the object function database 1013.

The data sorting rule 1011 is a database that stores rules relating to classes of data that can be specified by the reproduction device at a time of reproducing data indicating the motion of the object. Specifically, data for reproducing the motion of the object is divided into an "object motion" indicating a position change of the object and "object functions" related to functions achieved by the motion of the object. Then, the data for reproducing the "object functions" is stratified into different levels.

The object motion database 1012 is a database that stores how each object constituting the VR content is arranged, moved, and deformed after reproduction of the VR content is started. Specifically, information of the coordinates of each object constituting the VR content is stored in association with time elapsed after reproduction of the VR content is started. In other words, the object motion database 1012 is a database that stores data indicating the "object motion", and includes a "time" item and a "coordinates" item. The illustrated example shows an exemplary position change of a predetermined object. Taking a "pen in the virtual space" as an exemplary object, the object motion database 1012 records the motion of the pen in the form of coordinates of the pen at each point of time.

The object function database 1013 is a database that stores data indicating the "object functions" and stores such data stratified into different levels. The object function database 1013 includes information related to a function achieved by the object motion. The levels are determined based on the necessity of various data for reproducing the motion of the object. The illustrated example shows that the smaller the value of the level, the higher the necessity of the data. That is, the necessity of a function of level 1 is higher than a function of level 2.

For example, for a function of "drawing a red line by moving the pen in the virtual space", data related to a function of "moving the pen" is hierarchically stored as the level 1, data related to a function of "drawing a line with the pen" is hierarchically stored as the level 2, and data related to a function of "drawing a line in red" is hierarchically stored as the level 3. That is, in a case where the data of level 2 that is "drawing a line with the pen" premises the function of "moving the pen" in level 1, the necessity of the function of level 1 is higher than the function of level 2. Further, in a case where the data of level 3 that is "drawing a line in red" premises the function of "drawing a line with the pen" in level 2, the necessity of the function of level 2 is higher than the function of level 3. As described above, as the levels of the hierarchy deepens (as the value of the level increases), a function may premise a function in the preceding level.

Further, in some embodiments, the levels are determined based on the time of adding a function when the version is updated. The earlier the point of time the function is added, the lower the level of the data related to that function becomes. Further, data related to the class of the new function is stored continuously after the data related to the class of the function before the addition. For example, in a case of adding a new function of "drawing a line in red" at a time of updating the version, sets of data related to already-implemented functions of "moving the pen" and "drawing a line with the pen" are stored in level 1 and level 2, respectively, and a set of data related to "drawing a line in red" is stored as data of level 3.

<3 Process Flow>

Figure 4:
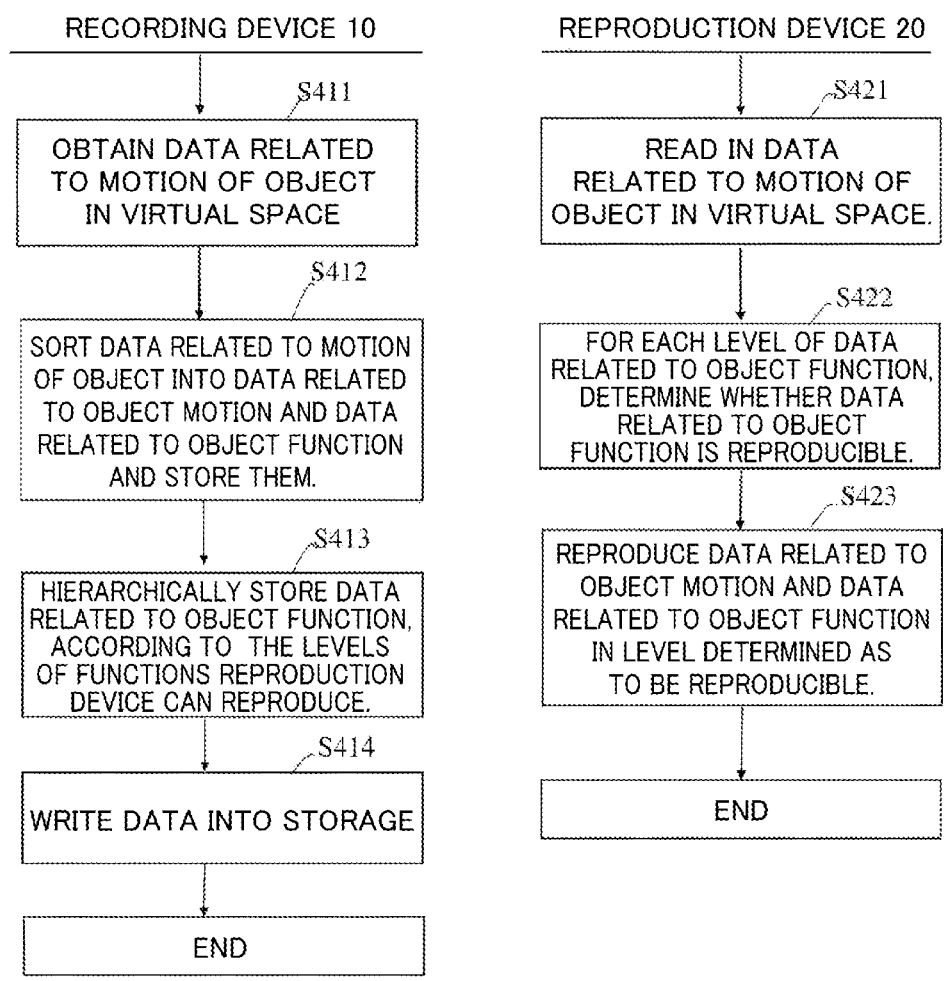
FIG. 4 is a flowchart showing an exemplary process flow of a content recording/reproduction system according to the first embodiment of the present disclosure.

The following describes, with reference to FIG. 4 and FIGS. 5A-C, an operation of the content recording/reproduction system related to the first embodiment of the present disclosure. FIG. 4 is a flowchart showing an exemplary process flow of a content recording/reproduction system according to the first embodiment. FIGS. 5A-C are diagrams showing an exemplary display screen of the reproduction device according to the first embodiment.

The flowchart of FIG. 4 shows how the operations of the recording device 10 and the reproduction device 20 are related to each other. Further, the description of FIG. 4 deals with an example where the recording device 10 and the reproduction device 20 are not connected to each other; however, the present disclosure is not limited to this, and the recording device 10 and the reproduction device 20 may be connected to and in communication with each other via a network.

First, the operation of the recording device 10 will be described.

In step S411, the recording device 10 obtains data related to the motion of the object in the virtual space. For example, the recording device 10 obtains data related to a pen motion of "drawing a red line by moving the pen in the virtual space".

In step S412, the recording device 10 separates data related to the motion of the object into data related to the object motion and data related to the object functions and store these sets of data. For example, the recording device 10 separates data related to the pen motion of "drawing a red line by moving the pen in the virtual space" into data related to a change in the position of the pen and data related to drawing a red line by moving the pen, and store these sets of data.

In step S413, the recording device 10 hierarchically stores the data related to the object functions, according to the classes (levels) of functions reproducible by the reproduction device. For example, for a function of "drawing a red line by moving the pen in the virtual space", the recording device 10 hierarchically stores the data related to a function of "moving the pen" as the level 1, the data related to a function of "drawing a line with the pen" as the level 2, and the data related to a function of "drawing a line in red" as the level 3.

In step S414, the recording device 10 writes, in the storage of the recording device 10, the data related to the object motion and the stratified sets of data related to the object functions.

Next, the operation of the reproduction device 20 will be described.

In step S421, the reproduction device 20 reads data related to the motion of the object in the virtual space, which is recorded by the recording device 10. For example, the reproduction device 20 reads data related to a pen motion of "drawing a red line by moving the pen in the virtual space".

In step S422, for the levels of data related to the object functions, the reproduction device 20 determines whether or not each level can be reproduced, according to the classes (levels) of the reproducible function. For example, the reproduction device 20 determines whether it is able to reproduce the level 3 data of "drawing a line in red", based on whether or not the reproduction device 20 has a function of reproducing the "drawing a line in red".

In step S423, the reproduction device 20 reproduces the data related to the object motion and the data related to the object function of the level determined as to be reproducible.

For example, as illustrated in FIG. 5A, in a case where the reproduction device 20 has a function of reproducing the "drawing a line in red", the reproduction device 20 reproduces the data related to the change in the position of the pen, the level 1 data, the level 2 data, and the level 3 data to reproduce a pen motion of "drawing a red line by moving the pen in the virtual space". Note that FIG. 5A shows a "red line" drawn by moving the pen object in the virtual space by a dotted line.

Further, as illustrated in FIG. 5B, in a case where the reproduction device 20 can reproduce the "drawing a line with the pen", but does not have a function of reproducing the "drawing a line in red", the reproduction device 20 reproduces the data related to the change in the position of the pen, the level 1 data, and the level 2 data to reproduce a pen motion of "drawing a line by moving the pen in the virtual space".

Further, as illustrated in FIG. 5C, in a case where the reproduction device 20 can reproduce the "moving the virtual pen", but does not have a function of reproducing the "drawing a line", the reproduction device 20 reproduces the data related to the change in the position of the pen and the level 1 data to reproduce a pen motion of "moving the pen in the virtual space".

Further, although illustration is omitted, if the reproduction device 20 is not able to reproduce a function used in the process of moving the object, the reproduction device 20 notifies the user that the reproduction is not possible. In this way, updating of the reproduction device can be prompted.

<4 Effects>

With the content recording/reproduction system related to the first embodiment of the present disclosure as described above, it is possible to provide a technology that allows the reproduction device to reproduce the VR content to its reproducible extent according to functions reproducible in the reproduction device, while providing a recording device that records VR content.

Second Embodiment

The following describes a second embodiment of the present disclosure, which is a content recording/reproduction system configured such that a comment object input by a user reproducing VR content is recorded to generate VR content with a comment (hereinafter, commented VR content) by a recording device and that the VR content with the comment is reproduced by the reproduction device.

First, with reference to FIG. 6, a configuration of a content viewing system 2 related to the present embodiment will be described. The content viewing system 2 includes a recording device 30 shown in FIG. 7, and a reproduction device 40 shown in FIG. 8. The recording device 30 and the reproduction device 40 are connected via a network NW so as to be able to communicate with each other. Although illustration is omitted in FIG. 6, the content viewing system 2 may include a user terminal for a user to view VR content, and a server device configured to distribute the VR content to the user terminal or the reproduction device 40. The recording device 30 distributes the VR content to the reproduction device 40 via the network NW. The recording device 30 may distribute the VR content to the reproduction device 40 via a server device for distributing the VR content, or the like. The user viewing the VR content inputs a comment object by using the reproduction device 40 and transmits the same to the recording device 30 or the server device. The recording device 30 or the server device records the comment object and generates commented VR content. The reproduction device 40 obtains and reproduces the VR content. The communication line of the network NW may be wired or wireless. Note that the VR content may be a live distribution which is distributed to the user terminal and the like as soon as the VR content is recorded by the recording device 30. Further, the VR content may be uploaded to the server device or the like, and the server device may be accessed by the user terminal and receive an input of a comment to the VR content being reproduced through the user terminal. The recording device 30 or the server device stores a time elapsed from the start of reproduction of the VR content in association with the comment input through the user terminal.

<1.1 Configuration of Recording Device 30>

Figure 7:
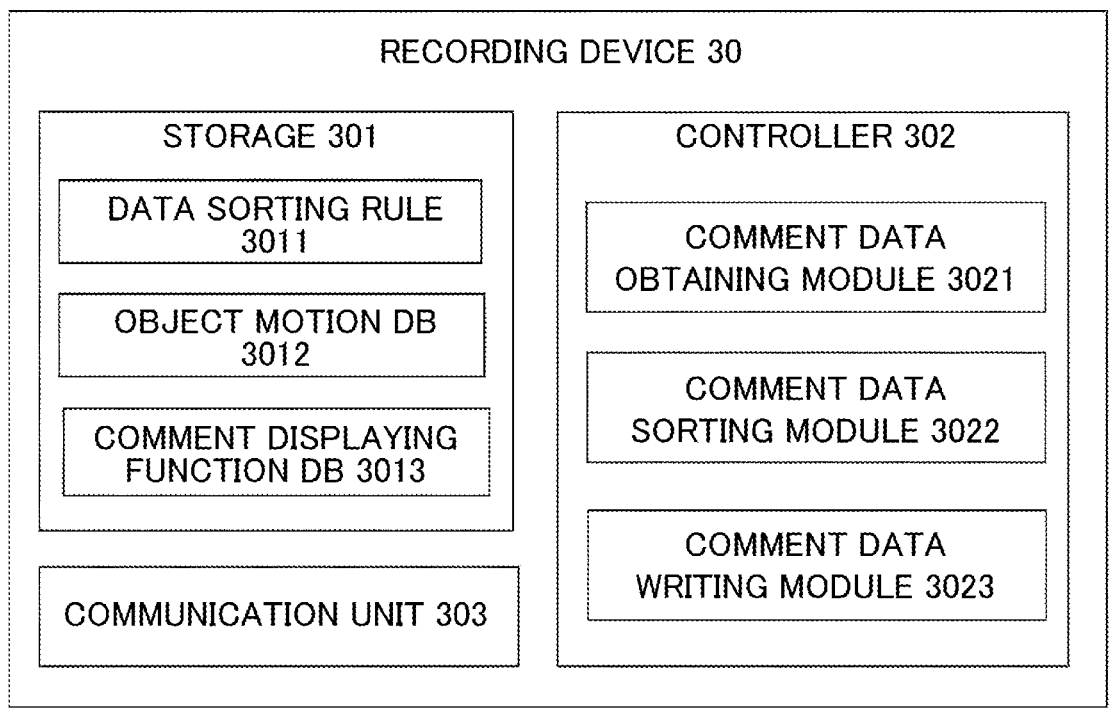
FIG. 7 is a diagram illustrating a functional configuration of a recording device according to the second embodiment of the present disclosure.

FIG. 7 is a diagram illustrating a functional configuration of the recording device 30. The recording device 30 is a device that records a motion of an object in the virtual space and stores the motion as VR content. As illustrated in FIG. 7, the recording device 30 includes a storage 301, a controller 302, and a communication unit 303.

The virtual space is similar to the virtual space defined in the first embodiment, and will not be repeatedly defined below.

The storage 301 stores data and a program for recording a motion of an object as VR content, and more specifically, stores a data sorting rule 3011, an object motion database 3012, and a comment displaying function database 3013. The data sorting rule 3011 is a database for storing rules relating to classes of data that can be specified by the reproduction device at a time of reproducing commented VR content. The object motion database 3012 is a database that stores data indicating a motion of a non-comment object. The comment displaying function DB 3013 is a database that stores data for displaying a comment input by the user viewing the VR content. The details will be described later.

The controller 302 performs a process of storing a comment input by the user viewing the VR content. Specifically, the controller 302 functions as various modules by causing a processor of the recording device 10 to perform processes according to a program.

A comment data obtaining module 3021 performs a process of obtaining a comment input by the user viewing the VR content. For example, the recording device 30 obtains, via the network NW, data related to a comment the user has input for an object motion of a predetermined point of time.

A comment data sorting module 3022 performs a sorting process for the comment data obtained by the comment data obtaining module 3021, based on the data sorting rule stored in the storage 301.

A comment data writing module 3023 performs a process of recording the comment data having been subjected to the sorting process and generating commented VR content.

The communication unit 303 communicates with the reproduction device 40 via the network NW. The VR content having no comment (hereinafter, uncommented VR content) or the commented VR content are transmitted with the communication unit 303 from the recording device 30 to the reproduction device 40. Further, the recording device 20 receives comment data input by the user from the reproduction device 40.

<1.2 Configuration of Reproduction Device 40>

Figure 8:
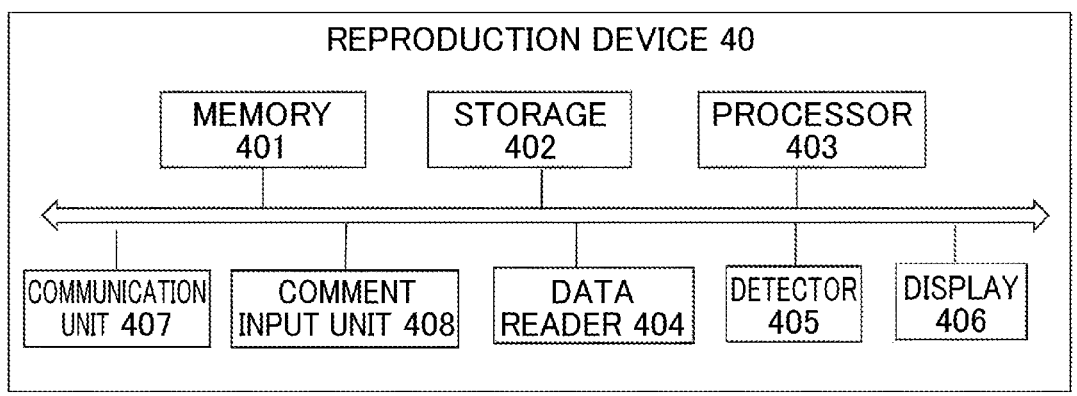
FIG. 8 is a diagram showing a functional configuration of the reproduction device according to the second embodiment of the present disclosure.

FIG. 8 is a diagram illustrating a functional configuration of the reproduction device 40. As illustrated in FIG. 8, the reproduction device 40 is a device for reproducing VR content in the virtual space, and includes a memory 401, a storage 402, a processor 403, a data reader 404, a detector 405, a display 406, a communication unit 407, and a comment input unit 408. For example, the reproduction device 40 may be a smartphone, a tablet terminal, a laptop PC, and the like, or a head mount device to be worn on the user's head.

The memory 401, the storage 402, the processor 403, the data reader 404, the detector 405, and the display 406 are similar to the memory 201, the storage 202, the processor 203, the data reader 204, the detector 205, and the display 206 of the first embodiment, and thus will not be repeatedly described.

The communication unit 407 communicates with the recording device 30 via the network NW. With the communication unit 407, the reproduction device 40 transmits comment data input by the user to the recording device 30. Further, the reproduction device 40 receives the uncommented VR content or the commented VR content from the recording device 30.

The comment input unit 408 is a component for receiving a user-operation of inputting a comment. For example, the user may enter comments via a keyboard, controller, touch screen, or the like.

<2 Data Structure>

The following describes a data structure of data stored in the recording device 30 related to the second embodiment of the present disclosure, with reference to FIG. 9.

FIG. 9 is a diagram showing an exemplary data structure of data constituting the commented VR content, which is stored in the recording device 30 of the second embodiment. The storage 301 of the recording device 30 stores the data sorting rule 3011, the object motion database 3012, and the comment displaying function database 3013.

The data sorting rule 3011 is a database for storing rules relating to classes of data that can be specified by the reproduction device at a time of reproducing VR content including a motion of a non-comment object and the comment. Specifically, data for reproducing the VR content including a motion of a non-comment object and a comment is divided into the "object motion" indicating a change in the position of the non-comment object and "comment displaying functions" that display a comment. Then, the data for reproducing the "comment displaying functions" is stratified into different levels.

The object motion database 3012 is a database that stores data indicating "a motion of a non-comment object". The object motion database 3012 includes a "time" item and a "coordinate" item, and indicates a change in the position of a predetermined object. Taking a "pen in the virtual space" as an exemplary object, the motion of the pen is recorded in the form of coordinates of the pen at each point of time.

The comment displaying function database 3013 is a database that stores data indicating the "comment displaying functions" and stores such data stratified into different levels. The comment displaying function database 3013 includes information related to the functions for displaying a comment. The levels are determined based on the necessity of various data for displaying a comment on the reproduction device. The illustrated example shows that the smaller the value of the level, the higher the necessity of the data.

For example, for a comment displaying function of "displaying a comment in a user-designated color (red characters) in the virtual space", data related to a function of "displaying a comment in a predetermined color" is hierarchically stored as the level 1 and data related to a function of "displaying the predetermined color in a user-designated color" is hierarchically stored as the level 2. That is, in a case where the data of level 2 that is "displaying the predetermined color (of a comment) in a user-designated color" premises the function of "displaying a comment in a predetermined color" in level 1, the necessity of the function of level 1 is higher than the function of level 2.

Further, in some embodiments, the levels are determined based on the time of adding a function when the version is updated. The earlier the point of time the function is added, the lower the level of the data related to that function becomes. Further, data related to the class of the new function is stored continuously after the data related to the class of the function before the addition. For example, in a case of adding a new function of "displaying a comment in bold" at a time of updating the version, sets of data related to already-implemented functions of "displaying a comment in a predetermined color" and "displaying a comment in a user-designated color (red characters)" are stored in level 1 and level 2, respectively, and a set of data related to "displaying a comment in bold" is stored as data of level 3. The above processes deal with an example where a comment is arranged in the virtual space; however, in a case where a comment to the VR content is displayed on a user terminal or the reproduction device 40, the comment may be superimposed on a screen drawn on the user terminal or the reproduction device 40, instead of arranging the comment in the virtual space, according to a setting of a virtual camera in the virtual space.

<3 Process Flow>

Figure 10:
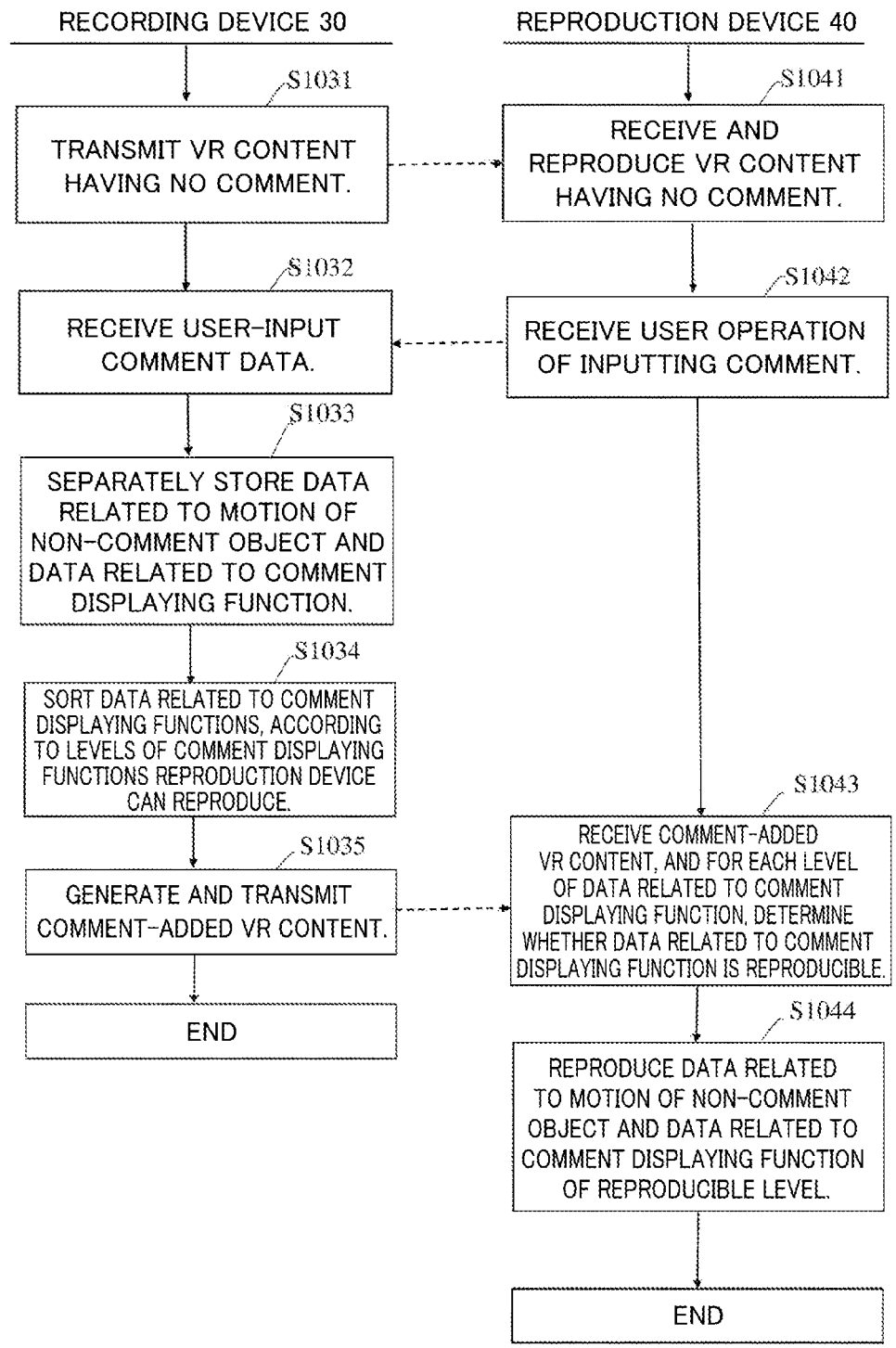
FIG. 10 is a flowchart showing an exemplary process flow of a content recording/reproduction system according to the second embodiment of the present disclosure.
Figure 11A:
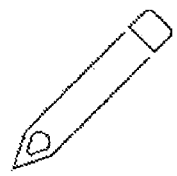
FIGS. 11A and B are diagrams showing an exemplary display screen of the reproduction device according to the second embodiment of the present disclosure.
Figure 11B:
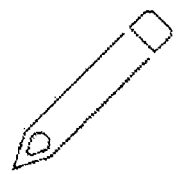

The following describes, with reference to FIGS. 10, 11A, and 11B, an operation of the content recording/reproduction system related to the second embodiment of the present disclosure. FIG. 10 is a flowchart showing an exemplary process flow of a content recording/reproduction system according to the second embodiment. FIGS. 11A and B are diagrams showing an exemplary display screen of the reproduction device according to the second embodiment of the present disclosure. The flowchart of FIG. 10 shows how the operations of the recording device 30 and the reproduction device 40 are related to each other.

First, the operation of the recording device 30 will be described.

In step S1031, the recording device 30 transmits uncommented VR content to the reproduction device 40. The uncommented VR content may include data related to a motion of a non-comment object.

In step S1032, the recording device 30 receives user-input comment data.

In step S1033, the recording device 30 separately stores data related to the motion of the non-comment object and data related to the comment displaying functions.

In step S1034, the recording device 30 hierarchically stores the data related to the comment displaying functions, according to the classes (levels) of functions reproducible by the reproduction device. For example, for a comment displaying function of "displaying a comment in red as designated by the user", the recording device 30 hierarchically stores data related to a function of "displaying a comment in a predetermined color" as the level 1 and data related to a function of "displaying the predetermined color in a user-designated color" as the level 2.

In step S1035, the recording device 30 generates, as commented VR content, the data related to the object motion and the stratified sets of data related to the comment displaying functions, and write the commented VR content into the storage. The VR content written in the recording device 30 may be transmitted to a server device or the like that distributes the VR content.

Next, the operation of the reproduction device 40 will be described.

In step S1041, the reproduction device 40 receives and reproduces the uncommented VR content from the recording device 30. The uncommented VR content may include data related to a motion of a non-comment object.

In step S1042, the reproduction device 40 receives a user-operation of inputting a comment. The user may designate a display mode of the comment.

In step S1043, the reproduction device 40 receives the commented VR content from the recording device 30, and for each level of data related to the comment displaying functions, determines whether or not the reproduction device 40 can reproduce the data related to the comment displaying function of that level. For example, the reproduction device 40 determines whether it is able to reproduce the level 2 data of "displaying a comment in a user-designated color (red)", based on whether or not the reproduction device 40 has a function of reproducing the "displaying a comment in a user-designated color (red)".

In step S1044, the reproduction device 40 reproduces the data related to the motion of the non-comment object, and the data related to the comment displaying function of the level determined as to be reproducible.

For example, as illustrated in FIG. 11A, in a case where the reproduction device 40 has a function of reproducing the "displaying a comment in a user-designated color (red characters)", the reproduction device 40 reproduces the data related to a change in the position of the pen, the level 1 data, and the level 2 data to display a comment reading "I want this pen!" in the user-designated color (red characters) as a display mode designated by the user. In the example of FIG. 11A, the comment displayed in the user-designated color is shown in italics and underlined.

Further, as illustrated in FIG. 11B, in a case where the reproduction device 40 does not have the function of reproducing the "displaying a comment in a user-designated color (red characters)", the reproduction device 40 reproduces the data related to the change in the position of the pen and the level 1 data to display a comment reading "I want this pen!" in a predetermined color (e.g., in black or a color set in advance), irrespective of the display mode designated by the user.

Further, although illustration is omitted, when the comment display function to display a comment in a designated mode cannot be reproduced, the reproduction device 40 notifies the user that the comment displaying function to display the comment as designated by the user cannot be reproduced. In this way, updating of the reproduction device can be prompted.

<4 Effects>

With the content recording/reproduction system 2 related to the second embodiment of the present disclosure as described above, it is possible to provide a recording device configured to record a comment object input by a user viewing VR content and a reproduction device configured to reproduce the VR content including the comment object to a reproducible extent according to the function reproducible by the reproduction device.

Third Embodiment

The following describes a third embodiment of the present disclosure, which is a content recording/reproduction system configured such that a gift object added by a user reproducing VR content is recorded to generate VR content including a gift object (hereinafter, gift object-added VR content) by a recording device and that the gift object-added VR content is reproduced by the reproduction device.

First, with reference to FIGS. 12 and 13, a configuration of a content viewing system 3 related to the present embodiment will be described. The content viewing system 3 includes a recording device 50 shown in FIG. 12, and a reproduction device 60 shown in FIG. 13. The recording device 50 and the reproduction device 60 are connected via a network so as to be able to communicate with each other. The recording device 50 distributes the VR content to the reproduction device 60 via the network. The user viewing the VR content adds a gift object by using the reproduction device 60 and transmits the same to the recording device 50. The recording device 50 records the gift object to generate the gift object-added VR content.

<1.1 Configuration of Recording Device 50>

Figure 12:
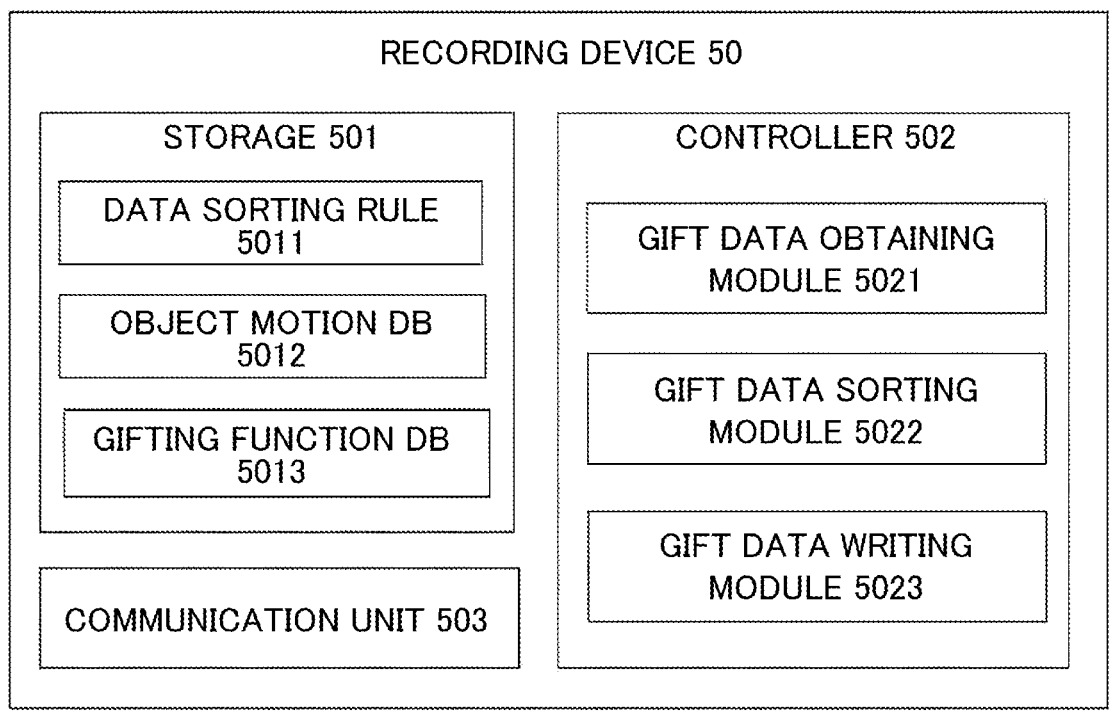
FIG. 12 is a diagram illustrating a functional configuration of a recording device according to a third embodiment of the present disclosure.

FIG. 12 is a diagram illustrating a functional configuration of the recording device 50. The recording device 50 is a device that records a motion of an object in the virtual space and stores the motion as VR content. As illustrated in FIG. 12, the recording device 50 includes a storage 501, a controller 502, and a communication unit 503.

The virtual space is similar to the virtual space defined in the first embodiment, and will not be repeatedly defined below.

The storage 501 stores data and a program for recording a motion of an object as VR content. Specifically, the storage 501 stores a data sorting rule 5011, an object motion database 5012, and a gifting function database 5013. The data sorting rule 5011 is a database for storing rules relating to classes of data that can be specified by the reproduction device at a time of reproducing gift object-added VR content. The object motion database 5012 is a database that stores data indicating an object motion in the VR content viewed by the user. The gifting function DB 5013 is a database that stores data for displaying a gift object added by the user viewing the VR content. The details will be described later.

The controller 502 performs a process of storing a gift object added by the user viewing the VR content. Specifically, the controller 502 functions as various modules by causing a processor of the recording device 50 to perform processes according to a program.

A gift data obtaining module 5021 performs a process of obtaining gift data added by the user viewing the VR content. For example, the gift data obtaining module 5021 obtains, via a network, information indicating that the user has added a gift for an object motion of a predetermined point of time.

A gift data sorting module 5022 performs a sorting process for the gift data obtained by the gift data obtaining module 5021, based on the data sorting rule stored in the storage 501.

A gift data writing module 5023 performs a process of recording the gift data having been subjected to the sorting process and generating gift object-added VR content.

The communication unit 503 communicates with the reproduction device 60 via the network. The VR content having no gift object or the gift object-added VR content is transmitted with the communication unit 503 from the recording device 50 to the reproduction device 60. Further, the recording device 50 receives gift data added by the user from the reproduction device 60.

<1.2 Configuration of Reproduction Device 60>

Figure 13:
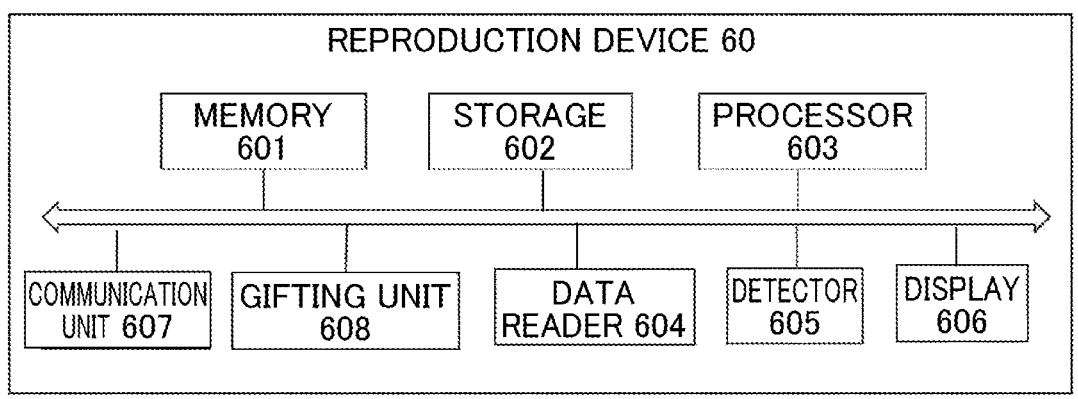
FIG. 13 is a diagram illustrating a functional configuration of a reproduction device according to the third embodiment of the present disclosure.

FIG. 13 is a diagram illustrating a functional configuration of the reproduction device 60. As illustrated in FIG. 13, the reproduction device 60 is a device for reproducing VR content in the virtual space, and includes a memory 601, a storage 602, a processor 603, a data reader 604, a detector 605, a display 606, a communication unit 607, and a gifting unit 608. For example, the reproduction device 60 is a mobile terminal, a stationary information processing terminal, a head mount device worn on the head of a user, or the like.

The memory 601, the storage 602, the processor 603, the data reader 604, the detector 605, the display 606, and the communication unit 607 are similar to the memory 401, the storage 402, the processor 403, the data reader 404, the detector 405, the display 406, and the communication unit 407 of the second embodiment, respectively, and thus will not be repeatedly described.

The gifting unit 608 is a component for receiving a user-operation of adding a gift to the VR content distributor. For example, the user may add a gift via a keyboard, controller, touch screen, or the like.

<2 Data Structure>

The following describes a data structure of data stored in the recording device 50 related to the third embodiment of the present disclosure, with reference to FIG. 14.

FIG. 14 is a diagram showing an exemplary data structure of data constituting the gift object-added VR content, which is stored in the recording device 50 of the third embodiment. The storage 501 of the recording device 50 stores the data sorting rule 5011, the object motion database 5012, and the gifting function database 5013.

The data sorting rule 5011 is a database for storing rules relating to classes of data that can be specified by the reproduction device at a time of reproducing VR content including a motion of a non-gift object and the gift object. Specifically, data for reproducing the VR content including a motion of a non-gift object and a gift object is divided into the "object motion" indicating a change in the position of the non-gift object and "gifting functions" that add a gift. Then, the data for reproducing the "gifting functions" is stratified into different levels.

The object motion database 5012 is a database that stores data indicating the "motion of a non-gift object". The object motion database 5012 includes a "time" item and a "coordinate" item, and indicates a change in the position of a predetermined object. Taking a "pen in the virtual space" as an exemplary object, the motion of the pen is recorded in the form of coordinates of the pen at each point of time.

The gifting function database 5013 is a database that stores data indicating the "gifting functions" and stores such data stratified into different levels. The levels are determined based on the necessity of various data for displaying a gift on the reproduction device. The higher the necessity of the data, the smaller the level value of the data becomes.

For example, for a gifting function of "displaying a gift object of a user-designated type in the virtual space", data related to a function of "displaying a gift object in a predetermined form" is hierarchically stored as the level 1 and data related to a function of "displaying a gift object of a user-designated type" is hierarchically stored as the level 2.

Further, in some embodiments, the levels are determined based on the time of adding a function when the version is updated. The earlier the point of time the function is added, the lower the level of the data related to that function becomes. Further, data related to the class of the new function is stored continuously after the data related to the class of the function before the addition.

<3 Process Flow>

The following describes, with reference to FIGS. 15, 16A, and 16B, an operation of the content recording/reproduction system related to the third embodiment of the present disclosure. FIG. 15 is a flowchart showing an exemplary process flow of a content recording/reproduction system according to the third embodiment. FIGS. 16A and B are diagrams showing an exemplary display screen of the reproduction device according to the third embodiment of the present disclosure. The flowchart of FIG. 15 shows how the operations of the recording device 50 and the reproduction device 60 are related to each other.

First, the operation of the recording device 50 will be described.

In step S1551, the recording device 50 transmits VR content having no gift object to the reproduction device 40. The VR content having no gift object may include data related to a motion of a non-gift object. For example, in a case where the VR content is generated for live distribution, the recording device 50 generates the VR content according to a motion of the user of the recording device 50. The recording device 50 transmits the VR content generated to the reproduction device 60 via a network through a server device or the like, or without going through a server device and the like.

In step S1552, the recording device 50 receives gift data input by the user.

In step S1553, the recording device 50 separately stores data related to the motion of the non-gift object and data related to the gifting functions.

In step S1554, the recording device 50 hierarchically stores the data related to the gifting function, according to the classes (levels) of functions reproducible by the reproduction device. For example, for a gifting function of "displaying a gift object of a user-designated type in the virtual space", the recording device 50 hierarchically stores data related to a function of "displaying a gift object in a predetermined mode" as the level 1 and data related to a function of "displaying a gift object of a user-designated type" as the level 2.

In step S1555, the recording device 50 generates, as gift object-added VR content, the data related to the object motion and the stratified sets of data related to the gifting functions and write the gift object-added VR content into the storage.

Next, the operation of the reproduction device 60 will be described.

In step S1561, the reproduction device 60 receives and reproduces the VR content having no gift object from the recording device 50. The VR content having no gift object may include data related to a motion of a non-gift object. Note that, in a case where another user has transmitted a gift object to the VR content, the reproduction device 60 may reproduce the gift object transmitted by the other user together with the VR content.

In step S1562, the reproduction device 60 receives a user-operation of adding a gift. The user may designate a display mode of the gift object.

In step S1563, the reproduction device 60 receives the gift object-added VR content from the recording device 50, and for each level of data related to the gifting function, determines whether or not the reproduction device 60 can reproduce the data related to the gifting function of that level. For example, the reproduction device 60 determines whether it is able to reproduce the level 2 data of "displaying a user-designated type of gift object", based on whether or not the reproduction device 60 has a function of reproducing the "displaying a user-designated type of gift object in a predetermined mode.

In step S1564, the reproduction device 60 reproduces the data related to the motion of the non-gift object, and the data related to the gifting function of the level determined as to be reproducible.

For example, as illustrated in FIG. 16A, in a case where the reproduction device 60 has a function of reproducing "gifting a heart-shaped gift object", the reproduction device 60 reproduces the data related to a change in the position of the pen, the level 1 data, and the level 2 data to reproduce gifting of the heart-shaped gift object.

Further, as illustrated in FIG. 16B, in a case where the reproduction device 60 does not have a function of reproducing "gifting a heart-shaped gift object", the reproduction device 60 reproduces the data related to the change in the position of the pen and the level 1 data to reproduce gifting of a predetermined gift object.

Further, although illustration is omitted, when the reproduction device 60 is not able to reproduce a designated type of gifting function, the reproduction device 60 reproduces a predetermined gift object, irrespective of the type designated by the user, and notifies the user that the designated type of gifting function cannot be reproduced. In this way, updating of the reproduction device can be prompted.

<4 Effects>

With the content recording/reproduction system 3 related to the third embodiment of the present disclosure as described above, it is possible to provide a recording device configured to record a gift object added by a user viewing VR content and a reproduction device configured to reproduce the VR content including the gift object to a reproducible extent according to the function reproducible by the reproduction device.

<Supplementary Notes>

The matters described in each of the above embodiments are additionally described below.

(Supplementary Note 1)

In a recording device (10) configured to record a motion of an object in a virtual space, a data structure of data related to the motion of the object recorded by the recording device (10) is used for a process of reproducing the motion of the object in the reproduction device (20). The recording device (10) includes a controller and a storage. The controller causes the storage to store, in association with the object, the data related to the motion of the object and data related to available functions for a process of moving the object (S412). The data related to the available functions for the process of moving the object is stored in the storage so that the reproduction device is able to specify a function class that is reproducible by the reproduction device (S413).

(Supplementary Note 2)

In the recording device (10) of (Supplementary Note 1), when a new function is added to the available functions for the process of moving the object, data of a class added to the available functions for the process of moving the object is stored in the storage, continuously after the data before the new function is added.

(Supplementary Note 3)

A reproduction device (20) configured to reproduce data recorded by the recording device (10) of (Supplementary Note 1), such that the reproduction device is configured to: specify a function that is reproducible in the reproduction device, out of the data related to the available functions for the process of moving the object (S422); and reproduce the motion of the object by using the data related to the motion of the object and the data related to the function specified (S423).

(Supplementary Note 4)

In the recording device (10) of (Supplementary Note 3), if any of the available functions for the process of moving the object cannot be reproduced, the reproduction device notifies that the available function is not reproducible.

(Supplementary Note 5)

In the recording device (10) of (Supplementary Note 1) and (Supplementary Note 2), the available functions for the process of moving the object encompass displaying of another object generated in the reproduction device through an operation by an operator (e.g., a performer) moving the object.

(Supplementary Note 6)

In the recording device (10) of (Supplementary Note 5), data related to a display mode of the other object is stored in the storage so that the reproduction device is able to specify a mode class that is reproducible by the reproduction device.

(Supplementary Note 7)

In the recording device (10) of (Supplementary Note 6), the data related to the display mode of the other object includes data related to a color and size of the other object.

(Supplementary Note 8)

In the recording device (10) of (Supplementary Note 1) and (Supplementary Note 2), the available functions for the process of moving the object encompass displaying of another object generated in the reproduction device through an operation by a user having viewed the process of moving the object.

(Supplementary Note 9)

In the recording device (10) of (Supplementary Note 8), the other object is a comment object generated by a user operation (S1032); the comment object is displayed in the reproduction device in a user-designated mode, if the reproduction device meets a standard to reproduce the comment object in the user-designated mode; and if the reproduction device fails to meet the standard to reproduce the comment object in the user-designated mode, the comment object is displayed in the reproduction device in a predetermined mode, irrespective of the user-designated display mode (S1034).

(Supplementary Note 10)

In the recording device (10) of (Supplementary Note 8), the other object is a gift object generated by a user operation (S1552); the gift object is displayed in the reproduction device as a gift object of a user-designated type, if the reproduction device meets a standard to reproduce the gift object as the gift object of the user-designated type; and if the reproduction device fails to meet the standard to reproduce the gift object as the gift object of the user-designated type, a predetermined gift object is displayed in the reproduction device, irrespective of the user-designated type of the gift object (S1554).

(Supplementary Note 11)

In a system including a recording device (10) configured to record a motion of an object in a virtual space and a reproduction device (20) configured to reproduce data recorded by the recording device (10), a data structure of data related to the motion of the object recorded by the recording device (10) is used for a process of reproducing the motion of the object in the reproduction device (20). The recording device (10) includes a controller and a storage. The controller causes the storage to store, in association with the object, the data related to the motion of the object and data related to available functions for a process of moving the object (S412). The data related to the available functions for the process of moving the object is stored in the storage so that the reproduction device is able to specify a function class that is reproducible by the reproduction device (S413). The reproduction device is configured to specify a function that is reproducible in the reproduction device, out of the data related to the available functions for the process of moving the object (S422), and reproduce the motion of the object by using the data related to the motion of the object and the data related to the function specified (S423).

(Supplementary Note 12)

In a recording method of recording a motion of an object in a virtual space, A data structure of data related to the motion of the object recorded by the recording method is used for a process of reproducing the motion of the object in the reproduction device. The recording method includes storing, in association with the object, the data related to the motion of the object and data related to available functions for a process of moving the object (S412). The data related to the available functions for the process of moving the object being stored so that the reproduction device is able to specify a function class that is reproducible by the reproduction device (S413).

(Supplementary Note 13)

A reproduction method of reproducing data recorded by the recording method of (Supplementary Note 12), includes: specifying a function that is reproducible in the reproduction device, out of the data related to the available functions for the process of moving the object (S422); and reproducing the motion of the object by using the data related to the motion of the object and the data related to the function specified (S423).

(Supplementary Note 14)

In a recording program executable in a computer that records a motion of an object in a virtual space, a data structure of data related to the motion of the object recorded by the recording program is used for a process of reproducing the motion of the object in the reproduction device. The computer includes a processor and a memory, and the recording program causes the processor to store, in association with the object, data related to the motion of the object and the data related to available functions for a process of moving the object (S412). The data related to the available functions for the process of moving the object being stored so that the reproduction device is able to specify a function class that is reproducible by the reproduction device (S413).

(Supplementary Note 15)

A reproduction program executable in a computer that reproduces data recorded by the recording program of (Supplementary Note 14), wherein the computer includes a processor and a memory, and the recording program causes the processor to specify a function that is reproducible in the reproduction device, out of the data related to the available functions for the process of moving the object (S422); and reproduce the motion of the object by using the data related to the motion of the object and the data related to the function specified (S423).

DESCRIPTION OF REFERENCE CHARACTERS

10 Recording Device
101 Storage
102 Controller
20 Reproduction Device
201 Memory
202 Storage
203 Processor
204 Data Reader
205 Detector
206 Display

The invention claimed is:

1. A recorder apparatus, comprising:
a controller; and
a storage device, wherein
the controller is configured to cause the storage device to store:
data related to a position change of an object based on a motion of the object in a virtual space, the motion of the object generated based on an operation by an operator moving the object in the virtual space; and
data related to a plurality of functions in a process for moving the object, the data related to the plurality of functions comprising data of a plurality of object functions achieved by the motion of the object and a plurality of function classes configured to be specified as reproducible by a reproduction device, and
the object functions include displaying, in the reproduction device, the motion of the object and another object in conjunction with the motion of the object generated based on the data related to the position change of the object and the data of an object function of a function class that is specified as reproducible by the reproduction device among the plurality of object functions and the plurality of function classes.

2. The recorder apparatus of claim 1, wherein the functions include displaying another motion of the object in the reproduction device based on a function added based on an operation by a user viewing the process for moving the object.

3. The recorder apparatus of claim 1, wherein the controller is configured to cause the storage device to add data of a function class related to another function immediately after the stored data of the function classes in the data related to the functions in the process for moving the object, if the other function is added to the functions in the process for moving the object.

4. The recorder apparatus of claim 1, wherein the controller is further configured to cause the storage device to store data related to a display mode of the other object, and
wherein the data related to the display mode of the other object comprises a display mode class that is reproducible by the reproduction device, the display mode class being configured to be specified by the reproduction device.

5. The recorder apparatus of claim 4, wherein the data related to the display mode of the other object comprises color and size of the other object.

6. The recorder apparatus of claim 1, wherein the functions in the process for moving the object include displaying another object in the reproduction device generated based on an operation by a user viewing the process for moving the object.

7. The recorder apparatus of claim 6, wherein the other object is a comment object generated based on the operation by the user,
wherein the controller is configured to cause the reproduction device to reproduce the comment object in a user-designated mode, if the reproduction device meets a standard to reproduce the comment object in the user-designated mode, and
wherein the controller is further configured to cause the reproduction device to reproduce the comment object in a predetermined mode, if the reproduction device fails to meet the standard to reproduce the comment object in the user-designated mode.

8. The recorder apparatus of claim 6, wherein the other object is a gift object generated based on the operation by the user,
wherein the controller is configured to cause the reproduction device to reproduce the gift object of a user-designated type, if the reproduction device meets a standard to reproduce the gift object, and
wherein the controller is further configured to cause the reproduction device to reproduce the gift object of a predetermined type, if the reproduction device fails to meet the standard to reproduce the gift object of the user-designated type.

9. A reproduction apparatus configured to reproduce data from a recording device, comprising:
a controller; and
a storage device configured to store the data from the recording device, the data comprising:
data related to a position change of an object based on a motion of the object in a virtual space, the motion of the object generated based on an operation by an operator moving the object in the virtual space; and
data related to a plurality of functions in a process for moving the object, the data related to the plurality of functions comprising data of a plurality of object functions achieved by the motion of the object and a plurality of function classes configured to be specified as reproducible in a reproduction device, wherein
the controller is configured to specify a function class that is reproducible in the reproduction device among the plurality of function classes, and further configured to reproduce the motion of the object and another object in conjunction with the motion of the object based on the data related to the position change of the object and the data of an object function of the specified function class among the plurality of object functions.

10. The reproduction apparatus of claim 9, wherein the controller is further configured to notify that a function is unreproducible when the functions in the process for moving the object are unavailable for reproduction.

11. A system, comprising:
a recording device configured to record a motion of an object in a virtual space; and
a reproduction device configured to reproduce data recorded by the recording device, wherein
the recording device comprises a controller and a storage device,
the controller is configured to cause the storage device to store the data comprising:
data related to a position change of an object based on the motion of the object in the virtual space, the motion of the object generated based on an operation by an operator moving the object in the virtual space; and
data related to a plurality of functions in a process for moving the object, the data related to the plurality of functions comprising data of a plurality of object functions achieved by the motion of the object and a plurality of function classes configured to be specified as reproducible by the reproduction device, and
the reproduction device is configured to specify a function class that is reproducible among the plurality of function classes, and further configured to reproduce the motion of the object and another object in conjunction with the motion of the object based on the data related to the position change of the object and the data of an object function of the specified function class among the plurality of object functions.

12. The system of claim 11, wherein the functions include displaying another motion of the object in the reproduction device based on a function added based on an operation by a user viewing the process for moving the object.

13. A method of recording a motion of an object in a virtual space, comprising:
storing data related to a position change of an object based on the motion of the object in the virtual space, the motion of the object generated based on an operation by an operator moving the object in the virtual space; and
storing data related to a plurality of functions in a process for moving the object, the data related to the plurality of functions comprising data of a plurality of object functions achieved by the motion of the object and a plurality of function classes configured to be specified as reproducible by a reproduction device, wherein
the object functions include displaying, in the reproduction device, the motion of the object and another object in conjunction with the motion of the object generated based on the data related to the position change of the object and the data of an object function of a function class that is specified as reproducible by the reproduction device among the plurality of object functions and the plurality of function classes.

14. A method of recording a motion of an object in a virtual space, comprising:
storing data related to a position change of an object based on the motion of the object in the virtual space, the motion of the object generated based on an operation by an operator moving the object in the virtual space; and
storing data related to a plurality of functions in a process for moving the object, the data related to the plurality of functions comprising data of a plurality of object functions achieved by the motion of the object and a plurality of function classes configured to be specified as reproducible by a reproduction device, wherein
the object functions include displaying, in the reproduction device, the motion of the object and another object in conjunction with the motion of the object generated based on the data related to the position change of the object and the data of an object function of a function class that is specified as reproducible by the reproduction device among the plurality of object functions and the plurality of function classes.

15. The method of claim 14, wherein the functions include displaying another motion of the object in the reproduction device based on a function added based on an operation by a user viewing the process for moving the object.

16. A method of reproducing recorded data comprising:
reproducing data from a recording device, the data comprising:
- data related to a position change of an object based on a motion of the object in a virtual space, the motion of the object generated based on an operation by an operator moving the object in the virtual space; and
- data related to a plurality of functions in a process for moving the object, the data related to the plurality of functions comprising data of a plurality of object functions achieved by the motion of the object and a plurality of function classes configured to be specified as reproducible in a reproduction device;

specifying a function class that is reproducible in the reproduction device among the plurality of function classes; and reproducing the motion of the object and another object in conjunction with the motion of the object based on the data related to the position change of the object and the data of an object function of the specified function class among the plurality of object functions.

17. A non-transitory computer-readable medium comprising instructions stored thereon, that when executed on one or more processors, causes the one or more processors to perform:
storing data related to a position change of an object based on a motion of the object in a virtual space, the motion of the object generated based on an operation by an operator moving the object in the virtual space; and
storing data related to a plurality of functions in a process for moving the object, the data related to the plurality of functions comprising data of a plurality of object functions achieved by the motion of the object and a plurality of function classes configured to be specified as reproducible by a reproduction device, wherein
the object functions include displaying, in the reproduction device, the motion of the object and another object in conjunction with the motion of the object generated based on the data related to the position change of the object and the data of an object function of a function class that is specified as reproducible by the reproduction device among the plurality of object functions and the plurality of function classes.

18. A non-transitory computer-readable medium comprising instructions stored thereon, that when executed on one or more processors, causes the one or more processors to perform:
storing data related to a position change of an object based on a motion of the object in a virtual space, the motion of the object generated based on an operation by an operator moving the object in the virtual space;
storing data related to a plurality of functions in a process for moving the object, the data related to the plurality of functions comprising data of a plurality of object functions achieved by the motion of the object and a plurality of function classes configured to be specified as reproducible in a reproduction device;
specifying a function class that is reproducible in the reproduction device among the plurality of function classes; and
reproducing the motion of the object and another object in conjunction with the motion of the object based on the data related to the position change of the object and the data of an object function of the specified function class among the plurality of object functions.

* * * * *